United States Patent [19]

Flamm et al.

[11] 4,130,490

[45] Dec. 19, 1978

[54] ELECTRIC DISCHARGE FOR TREATMENT OF TRACE CONTAMINANTS

[76] Inventors: Alan M. Lovelace, Administrator of the National Aeronautics and Space Administration, with respect to an invention of Daniel L. Flamm, Chatham Township, Morris County, N.J.; Theodore J. Wydeven, Jr., Sunnyvale, Calif.

[21] Appl. No.: 799,832

[22] Filed: May 23, 1977

[51] Int. Cl.² .............................................. B01K 1/00
[52] U.S. Cl. .................................. 250/531; 250/540; 250/541
[58] Field of Search ...................... 250/531, 540, 541; 423/245

[56] References Cited

U.S. PATENT DOCUMENTS

| | | | |
|---|---|---|---|
| 1,316,342 | 9/1919 | Walden | 250/540 |
| 1,803,600 | 5/1931 | Daily | 250/541 |
| 3,833,492 | 9/1974 | Bollyky | 204/176 |
| 3,875,034 | 4/1975 | Adams et al. | 250/531 |
| 3,979,193 | 9/1976 | Sikich | 250/531 |

OTHER PUBLICATIONS

Flamm, D. L., "A Model and Apparatus for Electrical Discharge Experiments," *Ind. Eng. Chem., Fundame*, 14(3), 1975, pp. 263–272.

Flamm, D. L. et al., "Oxidation of Contaminative Methane Traces ... ", *Environmental Sciences & Technology*, 10(6), Jun., 1976, pp. 591–595.

*Primary Examiner*—Benjamin R. Padgett
*Assistant Examiner*—Deborah L. Kyle
*Attorney, Agent, or Firm*—Darrell G. Brekke; John R. Manning; Armand McMillan

[57] ABSTRACT

A radio-frequency glow discharge reactor for removing trace oxidizable contaminants from an oxygen bearing atmosphere including a reaction chamber defined by an inner metal electrode facing a dielectric backed by an outer conductive electrode. In one embodiment, a conductive liquid forms the conductor of an outer electrode and cools the dielectric. A resonator coupled to a variable radio-frequency source generates the high voltages for creating a glow discharge in the chamber at a predetermined pressure whereby the trace contaminants are oxidized into a few simple non-toxic products that may be easily recovered. The corresponding process for removal of trace contaminants from an oxygen-bearing atmosphere with high efficiency independent of the concentration level is also disclosed.

11 Claims, 5 Drawing Figures

ELECTRIC DISCHARGE FOR TREATMENT OF TRACE CONTAMINANTS

ORIGIN

The invention described herein was made in the performance of work under a NASA contract and subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates generally to methods and apparatus for the removal by oxidation of trace contaminants from air and oxygen atmospheres.

2. Description of the Prior Art

In the closed atmosphere of a spacecraft or submarine, trace contaminants can reach toxic concentrations. These air pollutants range from metabolic products such as alcohols, esters, hydrogen sulfide and ammonia to solvents such as Freons, aromatics, alcohols, and ketones which are adsorbed or dissolved in equipment and lubricants. Further, there is a need to eliminate trace contaminants in the zero air used for the standardization of air monitoring equipment.

In the past, these contaminants have been controlled by adsorption, absorption and catalytic oxidation. That technology has many severe shortcomings. The adsorbents and absorbents become exhausted with use and many of them are suitable for only a particular class of compounds. Regenerative systems tend to be complicated and weighty. Catalysts are restricted in use, require heating, may generate toxic products, and can be poisoned. To date, activated charcoal adsorption has been most widely used for contaminant control in spacecraft, but this material suffers from the above shortcomings and has a very low capacity for many classes of compounds.

There is extensive literature on the production of a multitude of chemicals in various kinds of electrical discharges. However, only a few authors have suggested that these discharges might be used to treat or remove pollutants or contaminants. The literature which does consider the removal of contaminants emphasizes the energy efficiency of removal and quantity of material that can be efficaciously treated. No attempt is known to specifically remove small amounts of material, nor is any reported data known that show that the efficiency of removal does not significantly decrease with decreasing concentration of contaminant.

BRIEF SUMMARY OF THE INVENTION

It is therefore one object of the present invention to provide an improved method and apparatus for the removal by oxidation of trace contaminants from air and oxygen atmospheres.

It is another object of the present invention to provide such an improved method and apparatus for which a constant removal efficiency can be sustained even at vanishingly low concentration levels.

It is a further object of the present invention to provide an improved apparatus for the removal by oxidation of trace contaminants which can be operated without expending absorbants or other materials which must be regenerated or discarded.

It is yet another object of the present invention to provide such an improved apparatus which is capable of treating "difficult" materials such as Freons.

It is a yet further object of the present invention to provide such an apparatus which is lightweight, occupies a small volume, and is characterized by low heat generation and power consumption.

The objects of the present invention are achieved in one aspect by a radio-frequency glow discharge reactor for the chemical processing of an oxygen-bearing gas containing trace contaminants. The reactor includes an inner metal electrode facing a dielectric backed by an outer conductive electrode; means for cooling the metal electrode; means for cooling the outer electrode and dielectric; means for passing the oxygen-bearing gas containing trace contaminants between the metal electrode and the dielectric; and means for applying between the electrodes an alternating radio-frequency voltage to subject the oxygen bearing gas to a radio-frequency glow discharge, whereby the trace contaminants in the oxygen bearing gas are oxidized into a few simple products which can be easily removed. The discharge can be operated at low pressure, at atmospheric pressure or above atmospheric pressure.

In another aspect, the present invention relates to a process for the removal of trace contaminants from an oxygen bearing gas, with high efficiency independent of the concentration level of the contaminants, comprising the steps of subjecting the gas to a radio-frequency glow discharge between electrodes in a reaction chamber whereby the trace contaminants are oxidized into a few simple products which are non-toxic and can be easily removed, continuously maintaining the pressure in the reaction chamber at a predetermined pressure, and removing the undesirable products of the process.

The foregoing, as well as other objects, features and advantages of the present invention will become more apparent from the following detailed description taken in conjunction with the appended drawings.

DESCRIPTION OF THE PREFERRED EMBODIMENTS

Figure 1:
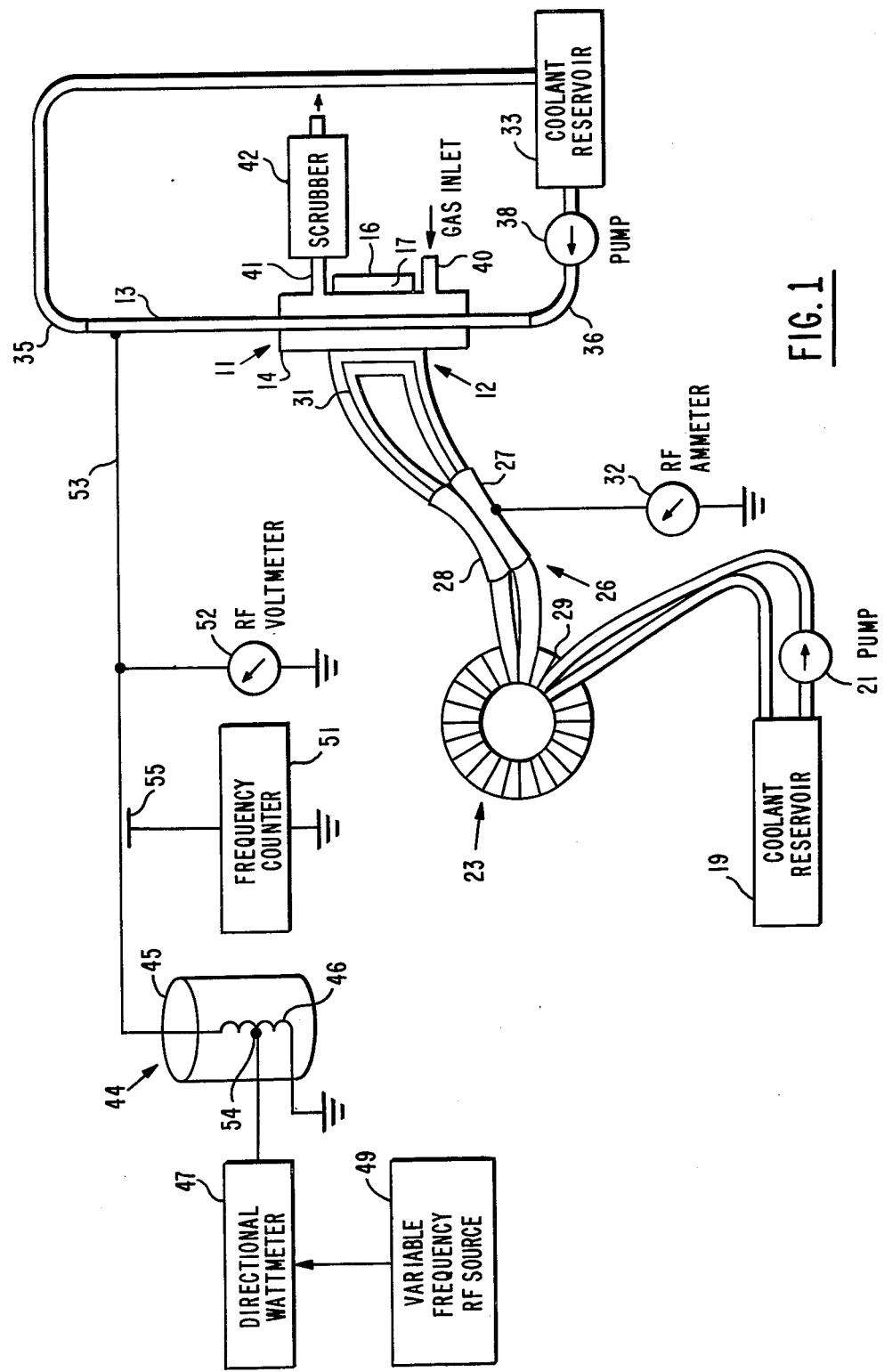
FIG. 1 is a diagrammatical view of a first embodiment of the radio-frequency glow discharge reactor in accordance with the present invention.

Referring now to the drawings, wherein like reference numerals designate identical or corresponding parts, there is shown in FIG. 1 a first embodiment of a radio-frequency glow discharge reactor for the chemical processing of an oxygen bearing gas containing trace contaminants. The gas may comprise, for example, the life support gas found in the work and rest quarters of a manned spacecraft or submarine. The reactor can be operated at various pressures. Tests that have been made with different reactors fabricated in accordance with the invention indicate that the reactor gas pressure may be up to and above atmospheric pressure.

A plasma reaction chamber 11 is defined by an outer r-f electrode 12, a gas chamber 14 and an inner r-f electrode 13. Inner electrode 13 is a generally cylindrical metallic tube. The middle portion of electrode 13 is encircled by a generally cylindrical gas chamber 14 having an inlet 40 and an outlet 41. The conductor of outer r-f electrode 12 is an electrically-conductive coolant 17 confined by a generally cylindrical shaped nonconductive housing 16 that encircles the midsection of gas chamber 14. The longitudinal axes of housing 16, gas chamber 14 and electrode 13 are coaxial. Housing 16 and chamber 14 are preferably made from a transparent dielectric substance such as quartz. Coolant 17, which may be saturated salt water, is pumped out of reservoir 19 by pump 21 to housing 16 via an r-f choke 23 and conduit 26 which has dielectric sections and a metal section 27. After the coolant leaves housing 16 it passes through metal section 28 and choke 23 before reaching reservoir 19. A wire 31 is suspended in the coolant passageway and the ends of the wire are secured to metal sections 27 and 28, respectively. The wire insures that the resistance of the coolant passageway in housing 16 will be an ohm or less. An r-f ammeter is connected between conduit section 27 and ground. Choke 23 preferably comprises flexible plastic tubing wound around a ferrite toroid 29. The ends of inner r-f electrode 13 are connected to dielectric conduits 35 and 36, respectively, and a nonconductive coolant, such as distilled water, is circulated through the interior of electrode 13 by means of a pump 38. Once the coolant leaves electrode 13 it is channeled to coolant reservoir 33 by means of conduit 35 which may be a flexible plastic hose. A scrubber 42 may be coupled to gas outlet 41 to absorb water, $CO_2$, or CO oxidation products resulting from the glow discharge process.

R-f energy is coupled to inner electrode 13 by means of lead 53 and the energy is derived from variable frequency r-f source 49. A helical resonator or similar low-loss resonant element characterized by a high Q is provided to generate a high voltage between the inner and outer electrodes that is sufficient to subject the gas in chamber 14 to a radio-frequency glow discharge. Resonator 44 comprises a coil 46 surrounded by a metal cylinder 45. The r-f energy from source 49 is connected to to tap 54 of coil 46. Helical resonators are more thoroughly described in Daniel Flamm's technical paper in *Ind. Eng. Chem. Fundam.*, Vol. 14, No. 3, 1975, pages 263–272, and that publication is incorporated herein by reference. A counter 51 with probe 55 is used to measure the frequency of the r-f energy whereas meters 52 and 32 monitor the r-f voltage and current, respectively. Choke 23 blocks r-f energy from pump 21 and reservoir 19, and insures that meter 32 measures only the r-f current flowing between the inner and outer electrodes. Wattmeter 47 monitors the r-f power being fed to the helical resonator.

Figure 2:
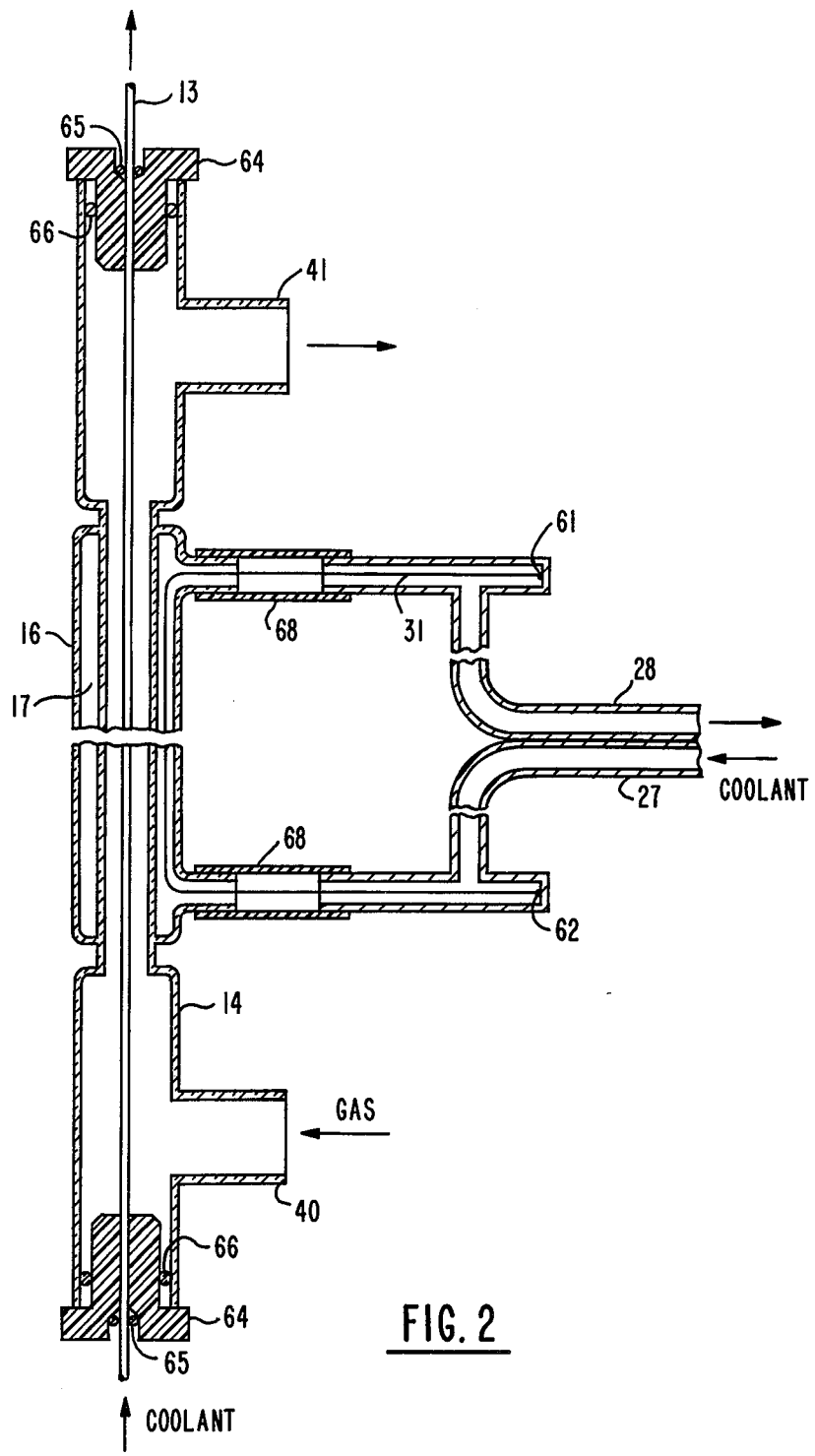
FIG. 2 is a cross-sectional view of the plasma reaction chamber in FIG. 1.

The plasma reaction chamber is illustrated in more detail in FIG. 2. Tubular inner r-f electrode 13 is supported by plugs 64 which are inserted in opposite ends of gas chamber 14. O-rings 65 maintain seals between electrode 13 and plugs 64 whereas O-rings 66 provide seals between plugs 64 and chamber 14. The plugs and O-rings may be made, for example, from Teflon ® and Viton A ®, respectively. Metal conduits 27 and 28 are coupled to housing 16 by sleeves 68 which may be, for example, plastic tubes. End 61 of wire 31 is connected to metal conduit 28 and end 62 of wire 31 is secured to conduit 27. Metal sections 27 and 28 are electrically connected by welding, soldering or some other means. The electrically-conductive coolant 17 is introduced to metal section 27 after leaving choke 23. After the coolant flows through housing 16, it returns to reservoir 19 via metal section 28 and choke 23. The gas with the trace contaminants enters gas chamber inlet 40, passes between the inner and outer r-f electrodes and exits outlet 41.

The operation of the radio-frequency glow discharge reactor shown in FIGS. 1 and 2 will now be described. An oxygen bearing gas containing trace contaminants is supplied at inlet 40 to the reaction chamber and maintained at a predetermined pressure. The conductive coolant 17 is circulated through cylindrical housing 16 forming the outer r-f electrode. Inner electrode 13 is cooled by a nonconductive coolant pumped therethrough from reservoir 33. R-f power is fed to the helical resonator which generates a high voltage across the two electrodes sufficient for creating a radio-frequency glow discharge in the reaction chamber at the predetermined pressure. As the gas passes into the r-f field between the electrodes, the radio-frequency excites the gas and initiates the breakdown therein to create the glow discharge. This glow discharge is composed of a highly reactive low-temperature gas plasma containing chemically active species of free radicals, atoms, ions and molecules. The trace contaminants in the plasma are oxidized into a few simple products such as water, carbon dioxide and carbon monoxide which are removed from the gas by scrubber 42.

The operating parameters for any particular operation are selected so as to produce a diffuse bluish-purplish glow discharge between the electrodes. Specifically, the density and gas temperature are kept low to produce a glow discharge not an arc. When the gas temperature is kept to a few hundred degrees centigrade or less the degree of ionization in the glow discharge is extremely low.

The electrode cooling apparatus is very important. If an electrode gets too hot, current has a tendency to concentrate at a point or points on the electrode. This may be due to a thermionic emission phenomenon. Once the current intensifies at a point, the electrode gets hotter at that point and causes even more current to flow at that point. This process continues until a stable arc occurs at that point which utilizes all of the discharge current available. The diffuse glow discharge vanishes and damage may occur to the structure from the intense concentrated heat if the r-f power is not turned off.

The electrodes are separated by a portion of the gas chamber wall. This dielectric material acts as a series capacitance with high impedance. (The dielectric constant for quartz, for example, is 4.34 at a frequency of $3 \times 10^7$ Hz when the measurement is taken normal to the optical axis.) The impedance limits the current that can flow between the electrodes and thus stabilizes the operation of the device at power levels characteristic of a glow discharge. The helical resonator 44 provides a high voltage so that sufficient current will pass through the high impedance dielectric to maintain a glow discharge.

The chemical reaction which oxidizes the contaminants is enhanced when the current between the electrodes is transported by a small number of high velocity electrons rather than by a large number of low velocity electrons. Accordingly, it is desirable to reduce the distance between the electrodes to provide a high electric field therebetween.

The operation of the glow discharge reactor has the following characteristics:
1. The function of contaminant removed increases with power.
2. The fraction of contaminant removed increases noticeably with decreasing flow rate.
3. The fraction of contaminant removed at a given power and flow rate is insensitive to concentration.
4. At constant power and pressure, the physical and electrical characteristics of the discharge are insensitive to flow rate.

Figure 3:
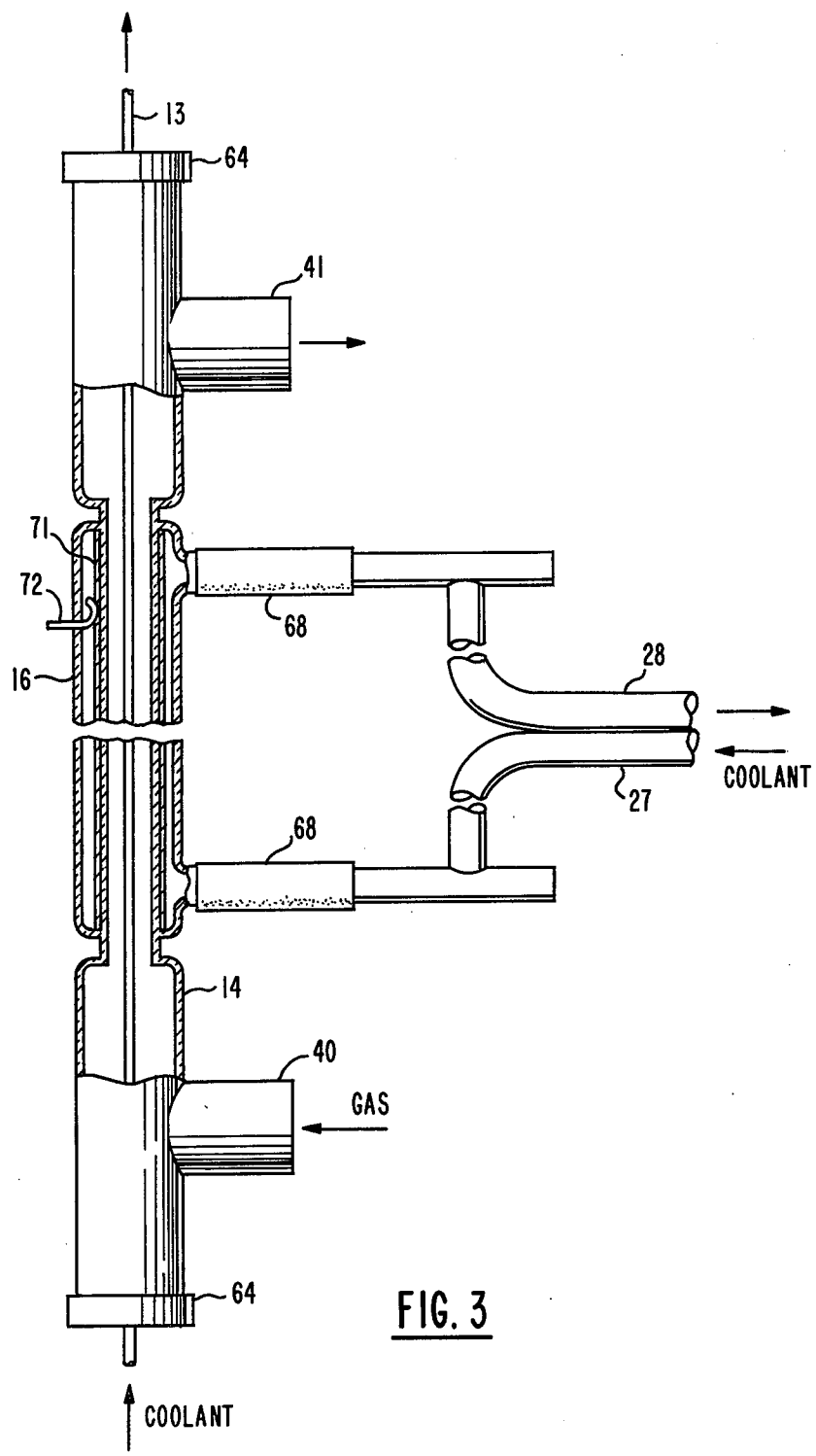
FIG. 3 is a partial cross-sectional view of a second embodiment of the plasma reaction chamber in accordance with the present invention.

A second embodiment is depicted in FIG. 3. This embodiment differs from the embodiment of FIGS. 1 and 2 in having an electrically-conductive coating 71 on the cylindrical dielectric wall surrounding inner electrode 13. The conductive coating 71 forms the outer r-f electrode. Feedthrough electrode 72 is in electrical contact with the coating and is used to couple coating 71 to r-f ammeter 32. A nonconductive coolant is circulated through the annular cavity formed by housing 16 and gas chamber 14 in order to cool the outer electrode and the dielectric adjacent it.

Figure 4:
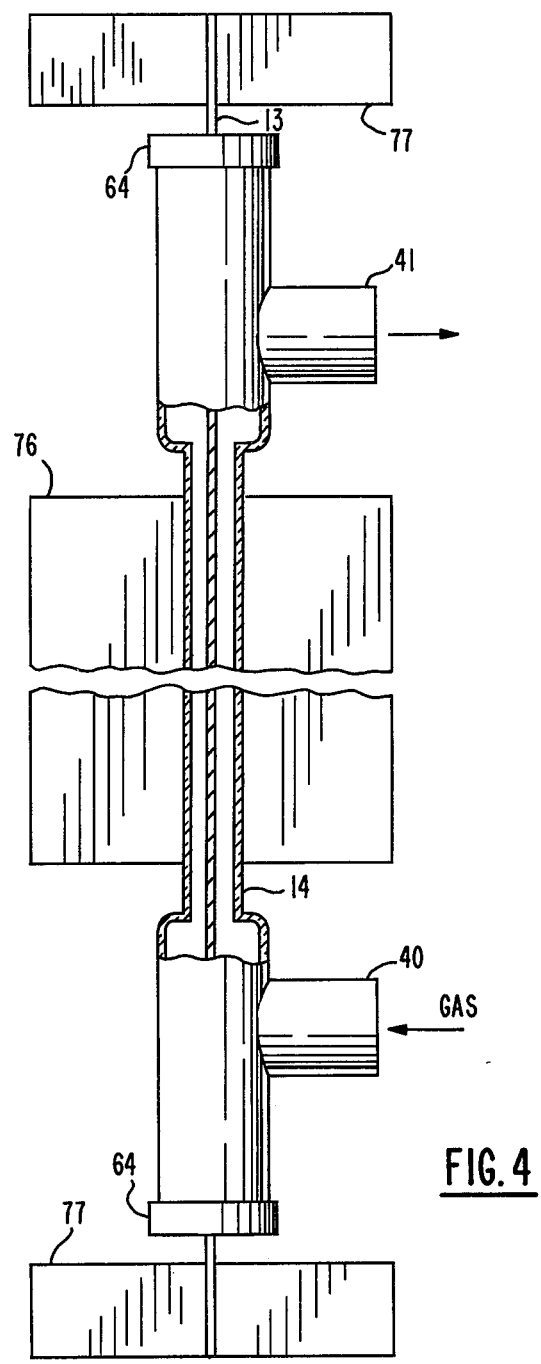
FIG. 4 is a partial cross-sectional view of a third embodiment of the plasma reaction chamber in accordance with the present invention.

A third embodiment of the invention is shown in FIG. 4. In this embodiment no coolant is employed and housing 16 is not needed. Metal cooling fins 76 encircle the middle section of gas chamber 14 and form the outer r-f electrode. Inner metal r-f electrode 13 is a heat pipe which conducts heat from the glow discharge region to metal cooling fins 77. Metal fins 76 and 77 can be cooled convectively by the motion of air over their surfaces or they can be thermally coupled to a solid heat sink (not shown).

Figure 5:
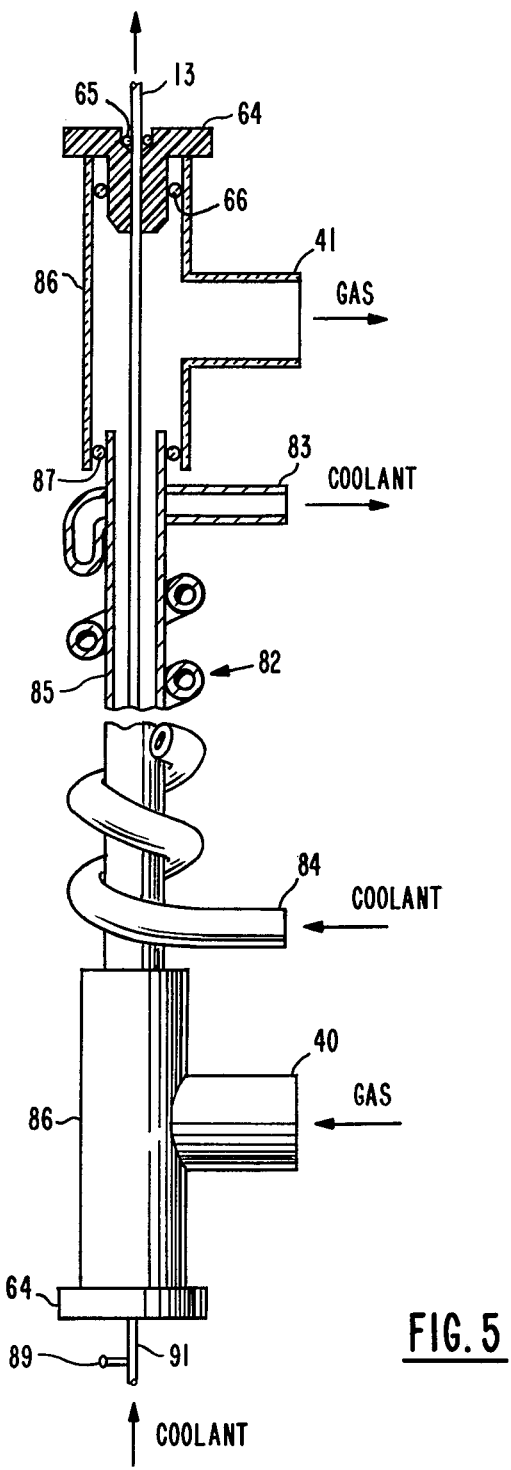
FIG. 5 is a partial cross-sectional view of a fourth embodiment of the plasma reaction chamber in accordance with the present invention.

A fourth embodiment of the invention is illustrated in FIG. 5. In this embodiment the gas chamber has a middle section 85 consisting of a metal cylinder. Cylinder 88 is sealed to nonconductive end pieces 86 by means of O-rings 87. A serpentine-shaped metal cooling coil 82 is wrapped around cylinder 85 and is in direct thermal contact therewith. A nonconductive coolant is circulated through the coil from inlet 84 to outlet 83. Inner r-f electrode is a conductive coolant circulated through dielectric tube 91. Feedthrough electrode 89 extends through the wall of tube 91 just far enough to touch the conductive coolant therein. The electrode enables the conductive coolant to be coupled to the r-f energy source. Instead of using a conductive coolant in tube 91, the inner surface of tube 91 can be coated with a conductive substance, and a nonconductive coolant can be circulated through the tube passageway. In this instance electrode 89 would make electrical contact with the conductive coating.

Tests conducted with three models of the FIGS. 1 and 2 embodiment revealed that the invention could reduce the concentration of methane by three orders of magnitude. Three different inner r-f electrode diameters, 0.079 cm, 0.159 cm, and 0.318 cm o.d. were used in the experiments. The inner quartz cylinder surrounding the r-f electrode was 0.5 cm i.d., and the longitudinal length of the discharge zone between the inner and outer electrodes was 9.1 cm. The discharge was operated between 50 and 600 torr with the inner electrodes of different diameter. R-f source 49 was operated at a frequency of 11.8 MHz. In order to obtain three orders of magnitude methane reduction at 50 torr it was necessary to use approximately 240 watts of r-f power whereas approximately 350 watts were required for a similar reduction at 600 torr. The longitudinal dimension of the glow discharge region (along electrode 13) was found to decrease as the pressure increased. For example, with the 0.159 cm electrode, the discharge extended axially only for about 5 cm during a run at 200 torr and 60 watts. The kinetics for the methane oxidation is described in the inventors' article in *Environmental Science & Technology*, Vol. 10, No. 6, June 1976, pages 591–594.

Obviously, numerous modifications and variations of the present invention are possible in light of the above teachings. It is therefore to be understood that within the scope of the appended claims, the invention may be practiced otherwise than as specifically described herein.

What is claimed is:
1. A radio-frequency glow discharge reactor for the chemical processing of an oxygen-bearing gas containing trace contaminants comprising:
   a first electrode facing a dielectric wall backed by a second electrode;
   first cooling means for cooling said first electrode;
   second cooling means for cooling said dielectric wall and said second electrode;
   means for channeling the oxygen-bearing gas containing trace contaminants between said first electrode and said dielectric wall; and
   a supply of high-voltage radio-frequency energy generated by a helical resonator, said supply being connected between said first and second electrodes to subject the oxygen bearing gas to a radio frequency glow discharge whereby the trace contaminants in the oxygen-bearing gas are oxidized into a few simple products.
2. A reactor as claimed in claim 1 wherein said second electrode comprises an electrically-conductive liquid.
3. A reactor as claimed in claim 2 wherein said dielectric wall is cylindrically shaped and said second electrode comprises a conductive coating on said dielectric wall.
4. A reactor as claimed in claim 1 wherein said first and second electrodes are cylindrical and coaxial.
5. A reactor as claimed in claim 1 wherein said first electrode is a heat pipe.
6. A reactor as claimed in claim 5 wherein said first cooling means comprises cooling fins affixed to the extremities of said heat pipe.
7. A reactor as claimed in claim 1 wherein said dielectric wall is cylindrically shaped and said second electrode comprises a conductive liquid within said dielectric wall.
8. A reactor as claimed in claim 7 wherein said first electrode is cylindrical and coaxial with said second electrode.
9. A reactor as claimed in claim 8 wherein said first cooling means includes a liquid-filled metal tube coiled about and in thermal contact with said first electrode.
10. A reactor as set forth in claim 1 wherein said supply of high-voltage radio-frequency energy comprises a variable frequency r-f source coupled to a helical resonator.
11. A reactor as described in claim 1 wherein said second cooling means includes:
   a reservoir of conductive liquid;
   a choke; and
   means for circulating said conductive liquid from said reservoir, through said choke, past said dielectric wall, through said choke and back to said reservoir.

* * * * *